Sept. 16, 1941.                L. C. BEERS                2,255,754
             MULTIPLE RECORD ELECTROLOGGING OF WELLS
                      Filed March 8, 1939            2 Sheets-Sheet 1
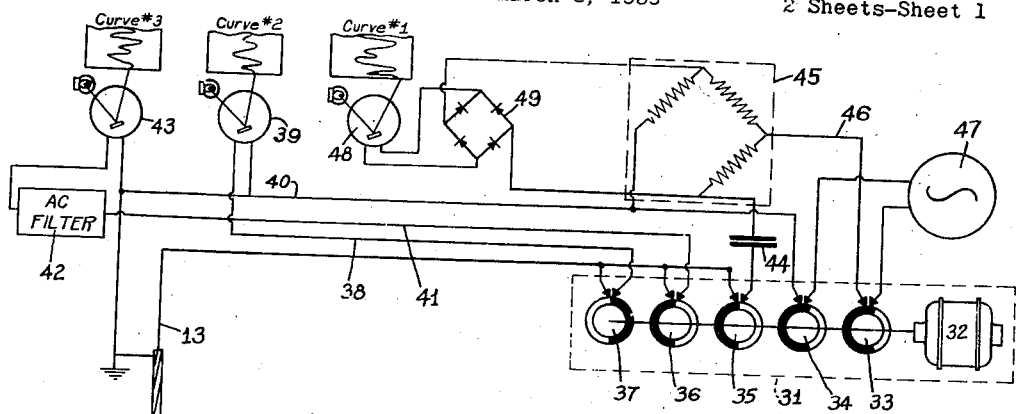
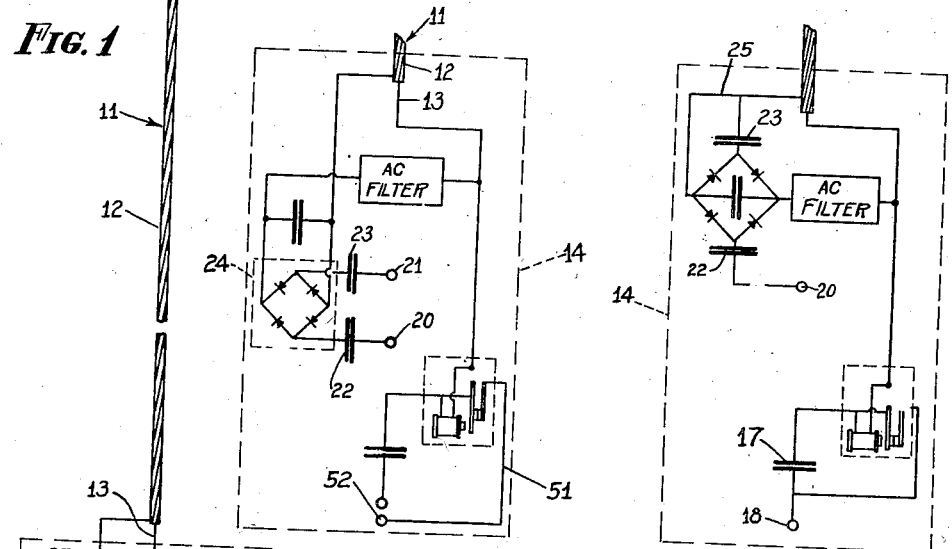
Fig. 1
Fig. 2
Fig. 3
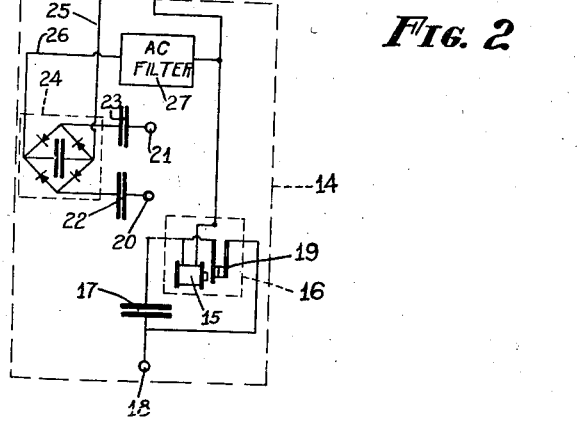
INVENTOR
LOWELL C. BEERS
BY Lloyd Spencer
ATTORNEY Patented Sept. 16, 1941

2,255,754

UNITED STATES PATENT OFFICE 2,255,754

MULTIPLE RECORD ELECTROLOGGING OF WELLS

Lowell C. Beers, Los Angeles, Calif., assignor to Lane-Wells Company, Los Angeles, Calif., a corporation of Delaware Application March 8, 1939, Serial No. 260,593

3 Claims. (Cl. 175—182)

My invention relates to multiple record electrologging of wells. An accepted present method of electrologging, that is, electrical investigation of formation traversed by a well-bore, employs an input circuit and a probe circuit terminating in four electrodes suspended from a multiple conductor cable. One electrode of the input circuit, as well as one of the electrodes of the probe circuit, may be the sheath of the cable itself, or the well casing above the region to be surveyed, or a surface ground. Electrical energy is supplied preferably to the lowermost electrode and to the sheath of the conductor, or casing, or upper electrode, or surface ground, as the case may be. The remaining two electrodes serve as probe electrodes. In practice, three, and sometimes four, "curves" or graphs are obtained by means of the electrodes and their associated electrical apparatus at the surface.

*First—Shallow resistivity.*—This is measured in the input circuit across the two input electrodes. If one of the electrodes, such as the casing or cable sheath, is of large area, the measurement obtained is largely that of the fluids in proximity to the other, or smaller, input electrode, due to the fact that the current density is greatest adjacent the small electrode.

*Second—Natural or spontaneous potential, or porosity.*—This is measured also between the two input electrodes, but without artificial current flowing in the circuit, so that the resulting voltage fluctuations in the circuit are due solely to the effect of the electrolyte present in the formation, in proximity to the well-bore.

*Third—Deep resistivity.*—This is the resistivity, or average resistivity, existing at a predetermined distance from the smaller input electrode. This is measured by means of two probe electrodes which require, in the conventional apparatus, two conductors leading to the surface, or one probe electrode and cable sheath with one extra conductor to the surface.

Among the objects of my invention are:

First, to provide a process and apparatus whereby the first, or shallow resistivity curve, and the second, or spontaneous potential curve, may be obtained with a single conductor cable during one trip into or out of a well-bore;

Second, to provide a process and apparatus of this character which is particularly designed for operation in conjunction with the process and apparatus for obtaining simultaneously the first curve and the third, or deep resistivity curve, such other process and apparatus being disclosed in the copending application, Serial No. 254,639, filed February 4, 1939, thus providing a process and apparatus which, when incorporated with that of said copending application, enables the production of all three curves with only a single trip into a well-bore and without the use of a multiple conductor cable;

Third, to provide a process and apparatus of this character wherein the first and second curves are taken in alternation, thereby minimizing the interference between the two circuits employed in order to obtain the curves;

Fourth, to provide a process and apparatus of this character wherein, without increasing the number of conductors in the cable, the circuits from which the first and second curves are derived may utilize separate electrodes or identical electrodes, as desired;

Fifth, to provide an apparatus of this character wherein those elements of the apparatus suspended from the cable and in immediate association with the electrodes may be extremely simple and compact, and fully capable of withstanding the extreme conditions of heat and pressure, as well as mechanical jarring or impacting encountered when lowered into a well-bore; and Sixth, to provide an apparatus of this character wherein a particularly simple and direct circuit is provided for the measurement of spontaneous potentials so that variations in the potentials measured, which are actually very weak, may be measured with high facility and with a minimum loss in transmission.

With the above and other objects in view, as will appear hereinafter, reference is directed to the drawings, in which:

Figure 1 is a wiring diagram illustrating my apparatus;

Figure 2 is a fragmentary wiring diagram of that portion of the apparatus associated with the electrodes, showing a modified form thereof;

Figure 3 is another wiring diagram of a further modified form of the apparatus associated with the electrodes.

Figure 4:
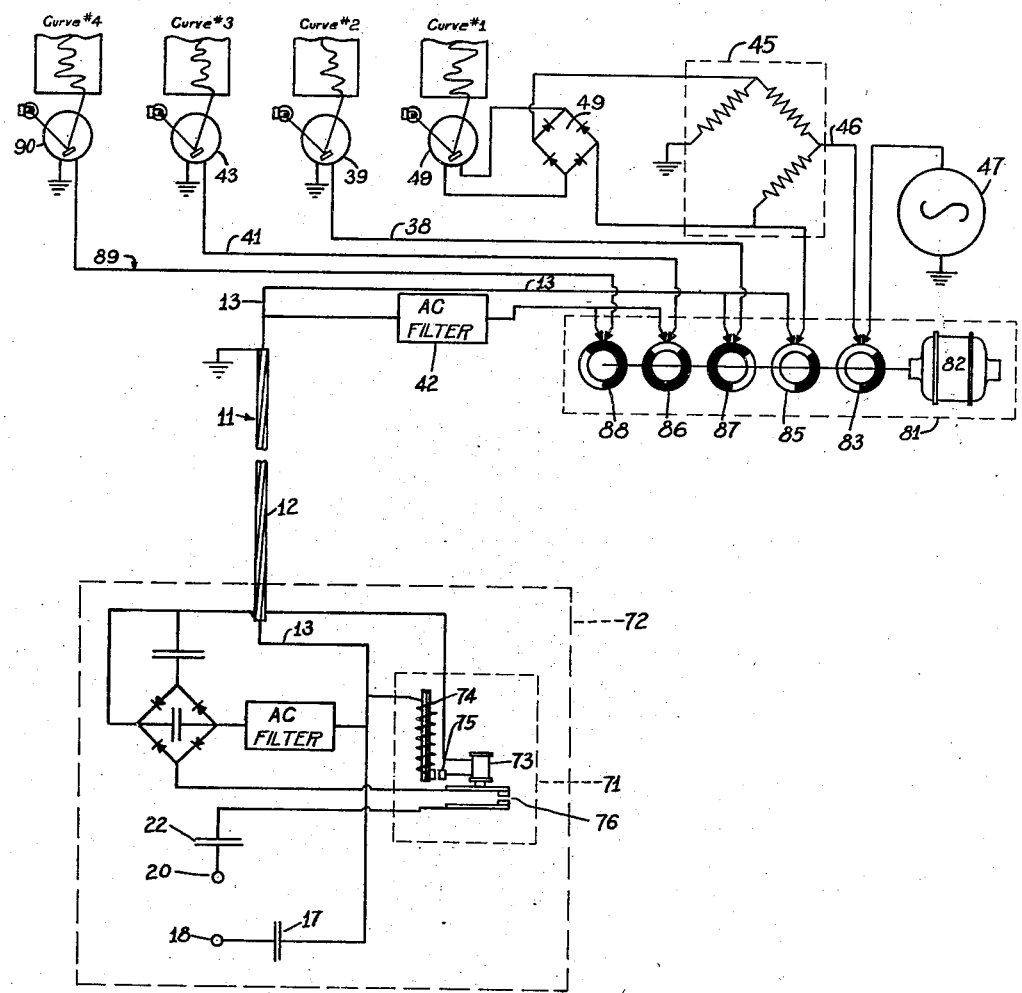
Figure 4 is a wiring diagram illustrating a further modification wherein four curves may be produced.

Reference is first directed to Figure 1: A single conductor cable 11 is employed which comprises a metallic sheath 12 and a single conductor 13. The sheath 12 serves both as a conductor and as one of the electrodes, inasmuch as this member is grounded. The lower end of the cable supports an electrode assembly, designated generally by 14. The conductor 13 is connected through a solenoid coil 15 of a relay 16 to a condenser 17 and an input electrode 18, which serves to measure both shallow resistivity and natural potentials, as will be explained hereinafter. The solenoid 15 operates a single contact switch 19 which, when closed, shorts out the condenser 17. This switch normally occupies a closed position and is held open only when the solenoid 15 is energized and current is flowing in the conductor 13 from an artificial source of supply.

The electrode assembly incorporates two probe electrodes 20 and 21 which are connected through condensers 22 and 23, respectively, to the alternating current side of a rectifier 24. The direct current side of said rectifier is connected by a lead 25 to the cable sheath 12 by lead 26 through an alternating current filter 27 to the conductor 13. The probe electrodes 20 and 21, and their associated circuits, are employed to measure deep resistivity, that is, to derive the third curve, and, except for its combination with the elements of my process and apparatus, is the invention embraced in the aforementioned copending application.

The surface equipment associated with the electrode assembly 14 comprises an interrupter mechanism 31, including a motor 32 and approximately semi-circular slip rings 33, 34, 35, 36 and 37, each of which, for convenience, are shown as coacting with a pair of brushes to complete and break circuits therethrough. The conductor 13 is connected to brushes which ride on slip rings 35, 36 and 37. The other brush of slip ring 37 is connected by a lead 38 to a suitable recording galvanometer 39, the other end of which is connected by a lead 40 to ground so that galvanometer 39 records the second curve. The other brush of slip ring 36 is connected through lead 41 to an alternating current filter 42, then to a recording galvanometer 43 which records the third curve. The other side of the galvanometer is connected to the lead 40.

The slip ring 35 connects, through a condenser 44, to an alternating current bridge 45, the other terminal of which is joined to the ground lead 40. The alternating current bridge 45 is provided with a lead 46 extending to a brush associated with slip ring 33 which, in turn, is connected with a source of alternating current 47. The other side of the alternating current 47 is connected to a slip ring 34, which is likewise connected to the ground lead 40.

A recording galvanometer 48 for the recording of the first curve is connected with the alternating current bridge 45, preferably through a meter rectifier 49 which, incidentally, may be similar to the rectifier 24 and permits the use of a direct current meter corresponding to meters 39 and 43 which are also direct-current operated.

Operation of my circuit is as follows: For one-half the cycle of operation the first and third curves are produced. During the other half of the cycle of operation the second curve is made. The cycle of operation of my apparatus is preferably materially less than the frequency of the alternating current source 47; for example, if the alternating frequency source is 60 cycles per second, the frequency cycles of the slip rings driven by the motor 32 may be ten per second; if a higher alternating current source frequency is used it follows, of course, that the cycle of my apparatus may be increased correspondingly.

During the one-half cycle of operation in which the first and third curves are being measured the alternating current source is connected to the ground lead 40 and to the bridge 45, one leg of which comprises the circuit through the conductor 13 and sheath 12. Consequently, alternating current, through condenser 17, is applied to the input electrode 18 and sheath 12 as the other input electrode, so as to establish an alternating current field therebetween. By reason of the fact that the sheath 12 of the cable has a relatively great area, the current density is very low, whereas the current density in immediate proximity to the electrode 18 is very high. As a result, the resistance of the circuit formed with the bridge 45 is particularly influenced by the resistivity of the fluids in close proximity to the electrode 18. This variation in resistance is measured by the galvanometer 48 connected with the bridge 45. Simultaneously therewith the probe electrodes 20 and 21 sample the field established between electrode 18 and the sheath 12. The electrical values obtained by these electrodes 20 and 21 are essentially that of the potential difference between equi-potential surfaces established with the electrode 18 as the center, one having a boundary defined by the position of electrode 20 and the other having a boundary defined by the position of electrode 21. The alternating current set up by the alternating potential sampled by the electrodes 20 and 21 is rectified and fed into the conductor 13 as direct current between the condensers 17 and 44, and by reason of these condensers, as well as condensers 22 and 23, such rectified current cannot find its way back into the formation, or be affected by any direct current field existing in the formation. Such rectified direct current is fed to the galvanometer 43 to form the third curve. The alternating current filters 27 and 42 prevent alternating current from the source 47 from finding its way into the direct current circuit established between the rectifier 24 and the galvanometer 43, unless such alternating current is picked up by the electrodes 20 and 21; and, therefore, is representative of the alternating current field established by the input electrodes. The operation and inter-relation of electrodes 18, 20 and 21, in this respect, is more particularly set forth in the copending application hereinbefore referred to.

During the other half cycle of operation, the alternating current supply 47 is opened, as well as the circuits through slip rings 35 and 36. The conductor 13 is connected, through slip ring 37, directly to galvanometer 39, and thence to ground 40. When this condition obtains, solenoid 15 of the relay switch 16 is de-energized, contacts 19 are closed, shorting condensers 17; and consequently, the only source of current flow in the circuit is due to the natural potentials, or spontaneous potentials, as they are sometimes called, existing in the formation and which bear a relation to the porosity of the formation, as has been well established in the art of electrologging.

The frequency of change-over from one circuit to the other and the type of galvanometer used are chosen so that the resulting curve will appear continuous, that is, the galvanometers are damped to carry them over their idle period. Thus, by first opening and then shorting condensers 17, and at the same time connecting and disconnecting the source of alternating current, it is possible to obtain the first and second curves in alternation.

It should be borne in mind that, while Figure 1 shows a lead from switch 19 extending to electrode 18, either electrode 20 or 21 may be substituted. Furthermore, it is possible, and in some instances preferable, to employ a separate electrode for the purpose of measuring natural or spontaneous potentials. This is done by running a lead 51 from the switch 19 to an electrode 52 which may be mounted anywhere in the electrode assembly, but preferably in close proximity to electrode 18, all of which is shown best in Figure 2. The remaining parts of the electrode assembly are similar to those previously described.

Reference is now made to Figure 3, in which is illustrated a modified form wherein one of the probe electrodes is made common with the sheath 12 of the cable. This is accomplished by merely interposing the condenser 23 in the lead 25 extending to the sheath 12 of the cable. Otherwise the circuit shown in Figure 3 may be similar to that shown in Figure 1 or 2.

It should be borne in mind that the art of electrologging has been well established and that the use of the cable sheath both as one or more of the electrodes, as well as the conductor, has been well established. In other words, it is well known in the art to measure by means of a two-conductor cable and two electrodes corresponding to electrodes 18 and 20, utilizing the sheath of the cable as both a probe and input electrode, as well as conductor. Similarly, it has been customary to use the equivalent of electrodes 18, 20 and 21 in association with a three-conductor cable and its sheath. Still further, it has been common practice to use four electrodes; in other words, making the second input electrode independent of the sheath, this, of course, requiring four conductors instead of three or two. Therefore, the term "electrode" includes the sheath insofar as it functions as the electrode, and the term "conductor" likewise includes the sheath insofar as it functions as a conductor.

A fourth curve is sometimes plotted in conventional electrolog practice, either in addition to or in substitution of the third curve. Such a fourth curve is, in effect, a combination of the second, or spontaneous potential curve, and the third, or deep resistivity curve, and, preferably, is obtained between a probe electrode and the sheath of the cable, or other elongated electrode, while the input circuit is in operation, but without means in the probe circuit for filtering out any direct current that may be present naturally in the formation. Such fourth curve is obtained, in conventional practice, whether the input circuit is direct current or alternating current.

It is possible to obtain such fourth curve in conjunction with my special arrangement, as indicated in Figure 4. In many respects the circuits shown in Figure 4 are similar to those shown in Figures 1, 2 and 3, and those parts which correspond to the elements in Figures 1, 2 and 3 bear the same reference characters. It is preferable to use the two-electrode system, that is, a single input electrode 18 and probe electrode 20 similar to that shown in Figure 3, the sheath 12 of the cable serving as a conductor as well as probe and input electrode.

A time-delay relay switch 71 is provided in the electrode assembly 72 at the lower end of the cable 11. The time-delay switch 71 includes a solenoid 73 and a thermostatic or other delay-action element 74 connected in series with each other across the conductor 13 and cable sheath 12. A pair of contacts 75 are adapted to be opened when the thermal element 74 has been energized a predetermined interval, thereby breaking the circuit to the solenoid 73 even though the input circuit is closed. The solenoid 73 controls a pair of contacts 76 which are adapted, when closed, to short out the condenser 22 associated with probe electrode 20.

At the surface, an interrupter 81 is provided which is represented as comprising a motor 82 which drives a series of contact rings 83, 85, 86, 87 and 88. The contactor rings are divided into thirds so that there are three periods to each cycle of operation. The contactor ring 83 corresponds to contactor ring 33 in that it connects the source of alternating current 47 with the lead 46 and the alternating current bridge 45. For convenience, the return circuit to the sheath 12 is shown as a ground connection; consequently, no contactor ring corresponding to ring 34 in Figure 1 is necessary.

Contactor ring 85 corresponds to contactor ring 35 and is connected through condenser 44 to one leg of the bridge 45 and to the conductor 13. Similarly, contactor ring 87 corresponds to contactor ring 37 and connects the conductor 13 with lead 38 to recording galvanometer 39, which produces the second curve.

Contactor ring 86, which corresponds to contactor ring 36, and an added contactor ring 88, are connected to the conductor 13 through an alternating current filter 42 and to leads 41 and 89, respectively, which connect to recording galvanometers 43 and 90, respectively, adapted to produce the third and fourth curves.

In this connection, it should be noted that the circuit to the recording galvanometer 43 is similar to that shown in Figure 1, except that the alternating current filter 42 is placed between the contactor ring and conductor 13 instead of between the contactor ring and recording galvanometer 43, inasmuch as the filter is needed for recording galvanometer 90.

Operation of the circuit shown in Figure 4 is as follows: The alternating current source is connected in the input circuit for two periods of the cycle. However, the time-delay switch 71 is so arranged that switch 76 remains open only during the first period of the cycle. During the first period of the cycle the recording galvanometer 43 is in operation, producing the third curve. During the second period of the cycle, when the switch 76 is closed the condenser 22 is shorted and recording galvanometer is connected by reason of its slip ring 88, so that both the spontaneous potentials and the alternating current field established between the electrode 18 and sheath 12 are picked up. It should be noted that the direct current resulting from the spontaneous potentials passes readily through the rectifier and alternating current filter, and the alternating current which is picked up is first rectified and then passed through the filter, so that both are delivered to the galvanometer 90 as direct current.

During both the first and second periods, the galvanometer 48, which plots the first curve, may be in operation. During the third period of operation, switch 76 is still closed, but no current is flowing in the input circuit, so that electrode 20 is responsive to spontaneous potentials only and these are measured by the recording galvanometer 39, this being the only galvanometer now connected in the circuit.

It should be noted that inasmuch as solenoid 73 and element 74 constitute a drain on the alternating current source, a dummy load may be substituted in this circuit during the second period, when switch 75 is open. Such auxiliary devices are, of course, contemplated, but for simplicity of illustration are omitted from the diagrams.

Various changes and alternate arrangements may be made within the scope of the appended claims, in which it is my intention to claim all novelty inherent in the apparatus and processes as broadly as the prior art permits.

I claim:

1. A method of measuring a plurality of electrical characteristics of formation confronting a well-bore and transmitting the same to the top of the well-bore, characterized by: establishing by an input circuit an electrical field in the formation between a pair of electrodes; measuring in the input circuit the electrical properties of the formation in proximity to said electrodes; sampling the current in the electrical field of said formation more remote from said electrodes; converting the current as sampled to a current distinguishable from the current of said input circuit; feeding said converted current through said input circuit to a measuring means; periodically interrupting the supply of said input circuit and said electrical field; and measuring the natural potential present at said electrodes when said electrical field is interrupted.

2. An apparatus for electrologging wells, comprising: a pair of electrodes adapted to be suspended in a well-bore in electrical association with formation traversed by said well-bore; an input circuit for establishing periodically an artificial electrical field through formation between said electrodes; means for measuring said artificial electrical field when said circuit is in operation; and means for measuring the natural electrical potential present in the formation when said circuit in inoperative and a relay switching mechanism in close proximity to said electrodes, for connecting said electrodes with said first means when said circuit is in operation, and for connecting said electrodes with said second means when said circuit is inoperative.

3. An apparatus as set forth in claim 2 wherein said input circuit is provided with an alternating current source whereby an alternating current field is established and wherein the period of operation and non-operation of said circuit have durations of at least several cycles of said alternating current.

LOWELL C. BEERS.